US 9,255,796 B2

(12) United States Patent
Kodaira et al.

(10) Patent No.: US 9,255,796 B2
(45) Date of Patent: Feb. 9, 2016

(54) LASER SURVEYING DEVICE

(71) Applicant: Kabushiki Kaisha TOPCON, Tokyo (JP)

(72) Inventors: Junichi Kodaira, Tokyo (JP); Fumihiko Kamizono, Tokyo (JP)

(73) Assignee: Kabushiki Kaisha TOPCON, Tokyo (JP)

( * ) Notice: Subject to any disclaimer, the term of this patent is extended or adjusted under 35 U.S.C. 154(b) by 66 days.

(21) Appl. No.: 14/305,121

(22) Filed: Jun. 16, 2014

(65) Prior Publication Data

US 2014/0373370 A1    Dec. 25, 2014

(30) Foreign Application Priority Data

Jun. 25, 2013   (JP) ................................. 2013-132227

(51) Int. Cl.
*G01C 5/00* (2006.01)
*G01C 15/00* (2006.01)

(52) U.S. Cl.
CPC .............. *G01C 15/00* (2013.01); *G01C 15/008* (2013.01)

(58) Field of Classification Search
CPC ............................ G01C 15/002; G01C 15/008
USPC ................................................... 33/290, 292
See application file for complete search history.

(56) References Cited

U.S. PATENT DOCUMENTS

| | | | |
|---|---|---|---|
| 5,485,266 A | 1/1996 | Hirano et al. | |
| 5,784,155 A * | 7/1998 | Ohtomo ............... | G01C 15/004 356/141.1 |
| 2004/0071074 A1 * | 4/2004 | Ootera ............... | G11B 7/24085 369/275.4 |
| 2004/0246498 A1 * | 12/2004 | Kumagai ............. | G01C 15/002 356/614 |
| 2006/0090357 A1 * | 5/2006 | Wuersch .............. | G01C 15/004 33/290 |
| 2007/0195313 A1 * | 8/2007 | Haijima .............. | G01C 15/002 356/138 |
| 2010/0079745 A1 * | 4/2010 | Eno .......................... | G01C 3/08 356/5.11 |
| 2010/0321673 A1 * | 12/2010 | Hayashi .............. | G01C 15/008 356/139.1 |
| 2010/0323433 A1 * | 12/2010 | Shi .................... | B01L 3/502715 435/287.9 |
| 2015/0029489 A1 * | 1/2015 | Metzler ............... | G01C 15/002 356/4.01 |

FOREIGN PATENT DOCUMENTS

JP          2007-271627 A          10/2007

OTHER PUBLICATIONS

The extended European search report issued by the European Patent Office on Nov. 21, 2014, which corresponds to European Patent Application No. 14173619.9-1557 and is related to U.S. Appl. No. 14/305,121.

* cited by examiner

*Primary Examiner* — G. Bradley Bennett
(74) *Attorney, Agent, or Firm* — Studebaker & Brackett PC

(57) ABSTRACT

A laser surveying device includes a rotatable and tiltable laser head in a housing to rotate about a rotational axis set in a certain direction and project a laser beam around and a tilt angle detector to detect a tilt angle of the laser head relative to the housing. The tilt angle detector includes a pattern plate on which a certain pattern is formed, provided in one of the laser head and the housing, light receiving elements arranged in the other of the laser head and the housing at different positions opposite to positions of the pattern plate to receive light beams reflected by the pattern plate, and a determiner to determine a direction and an amount of tilt of the laser head on the basis of a light receiving amount of each of the light receiving elements.

8 Claims, 11 Drawing Sheets

FIG.8

TABLE 1

| TILT ANGLE | S1 | S2 | S3 | S4 |
|---|---|---|---|---|
| 3 | ON | OFF | OFF | OFF |
| 2 | ON | OFF | ON | OFF |
| 1 | ON | OFF | ON | ON |
| 0 | ON | OFF | OFF | ON |
| −1 | ON | ON | OFF | ON |
| −2 | OFF | ON | OFF | ON |
| −3 | OFF | OFF | OFF | ON |

FIG.9

TABLE 2

| TILT ANGLE | S5 | S6 | S7 | S8 |
|---|---|---|---|---|
| 3 | ON | OFF | OFF | OFF |
| 2 | ON | OFF | ON | OFF |
| 1 | ON | OFF | ON | ON |
| 0 | ON | OFF | OFF | ON |
| −1 | ON | ON | OFF | ON |
| −2 | OFF | ON | OFF | ON |
| −3 | OFF | OFF | OFF | ON |

FIG.13

TABLE 3

| TILT ANGLE IN X DIRECTION (deg.) | S1a | S2a | S3a | |
|---|---|---|---|---|
| over 3 | | | | |
| 2 to 2.99 | ON | OFF | OFF | |
| 1 to 1.99 | ON | OFF | ON | |
| 0 to 0.99 | ON | ON | ON | ⎫ |
| −0.99 to 0 | OFF | ON | ON | ⎬ F1 |
| −1 to −1.99 | OFF | OFF | ON | ⎭ |
| −2 to −2.99 | OFF | OFF | OFF | |
| below −3 | | | | |

FIG.14

TABLE 4

| TILT ANGLE IN Y DIRECTION (deg.) | S5a | S4a | S3a | |
|---|---|---|---|---|
| over 3 | | | | |
| 2 to 2.99 | ON | OFF | OFF | |
| 1 to 1.99 | ON | OFF | ON | |
| 0 to 0.99 | ON | ON | ON | ⎫ |
| −0.99 to 0 | OFF | ON | ON | ⎬ F2 |
| −1 to −1.99 | OFF | OFF | ON | ⎭ |
| −2 to −2.99 | OFF | OFF | OFF | |
| below −3 | | | | |

LASER SURVEYING DEVICE

CROSS REFERENCE TO RELATED APPLICATION

The present application is based on and claims priority from Japanese Patent Application No. 2013-132227, filed on Jun. 25, 2013, the disclosure of which is hereby incorporated by reference in its entirety.

BACKGROUND OF THE INVENTION

1. Field of the Invention

The present invention relates to a laser surveying device which rotates a laser head to project a laser beam around.

2. Description of the Related Art

In related art Japanese Patent Application Publication No. 2007-271627 discloses a laser surveying device comprises a rotatable, tiltable laser head in a housing, to rotate the laser head to project a laser beam around, for example.

Such a laser surveying device comprises a laser projector tiltable relative to the housing and projecting a laser beam upward, a laser head rotatably provided above the laser projector, a first tilt sensor to detect a tilt angle of the laser projector in X direction, a second tilt sensor to detect a tilt angle of the laser projector in Y direction, a tilt mechanism to tilt the laser projector to be vertical on the basis of a result of the first and second tilt sensors, and a cover glass provided above the housing to cover the laser head.

The laser projector is controlled to be vertically directed by the tilt mechanism on the basis of a result of the first and second tilt sensors. Along with the rotation of the laser head, the laser beam is projected around from the laser projector via the cover glass.

The laser surveying device includes four columns to support the cover glass. However, these columns may disadvantageously block the laser beam and deform the profile of the laser beam, which results in decreasing surveying accuracy in the area in which the laser beam is blocked by the columns. In view of this, the laser surveying device is configured to stop projecting a laser beam in this area. When the laser projector in rotation does not tilt at all relative to the housing, the area in which beam projection is stopped can be narrow. However, the larger the tilt of the laser projector is, the wider the area is.

The beam projection stop area is set to be wide in accordance with an assumed maximal tilt for the purpose of preventing a decrease in surveying accuracy without a tilt sensor for the laser head relative to the housing. This leads to unnecessarily narrowing the surveying area illuminated with the laser beam, even when the tilt angle of the laser projector relative to the housing is zero.

SUMMARY OF THE INVENTION

The present invention aims to provide a laser surveying device which does not need to needlessly narrow the illumination area of a laser beam.

According to one embodiment of the present invention, a laser surveying device comprises a rotatable and tiltable laser head in a housing to rotate about a rotational axis set in a certain direction and project a laser beam around, and a tilt angle detector to detect a tilt angle of the laser head relative to the housing, including a pattern plate on which a certain pattern is formed, provided in one of the laser head and the housing, light receiving elements arranged in the other of the laser head and the housing at different positions opposite to positions of the pattern plate to receive light beams reflected by the pattern plate, and a determiner to determine a direction and an amount of tilt of the laser head on the basis of a light receiving amount of each of the light receiving elements.

BRIEF DESCRIPTION OF THE DRAWINGS

Features, embodiments, and advantages of the present invention will become apparent from the following detailed description with reference to the accompanying drawings:

FIG. 8 shows a relation between light receiving of first light receiving elements and a direction and amount of tilt of the laser projector;

FIG. 9 shows a relation between light receiving of second light receiving elements and a direction and amount of tilt of the laser projector;

FIG. 13 shows the relation between the tilt angle of the pattern plate in X direction and light receiving states of the light receiving elements;

FIG. 14 shows the relation between the tilt angle of the pattern plate in Y direction and light receiving states of the light receiving elements;

DETAILED DESCRIPTION OF THE PREFERRED EMBODIMENTS

Hereinafter, embodiments of the present invention will be described in detail with reference to the accompanying drawings. Wherever possible, the same reference numbers will be used throughout the drawings to refer to the same or like parts.

First Embodiment

Figure 1:
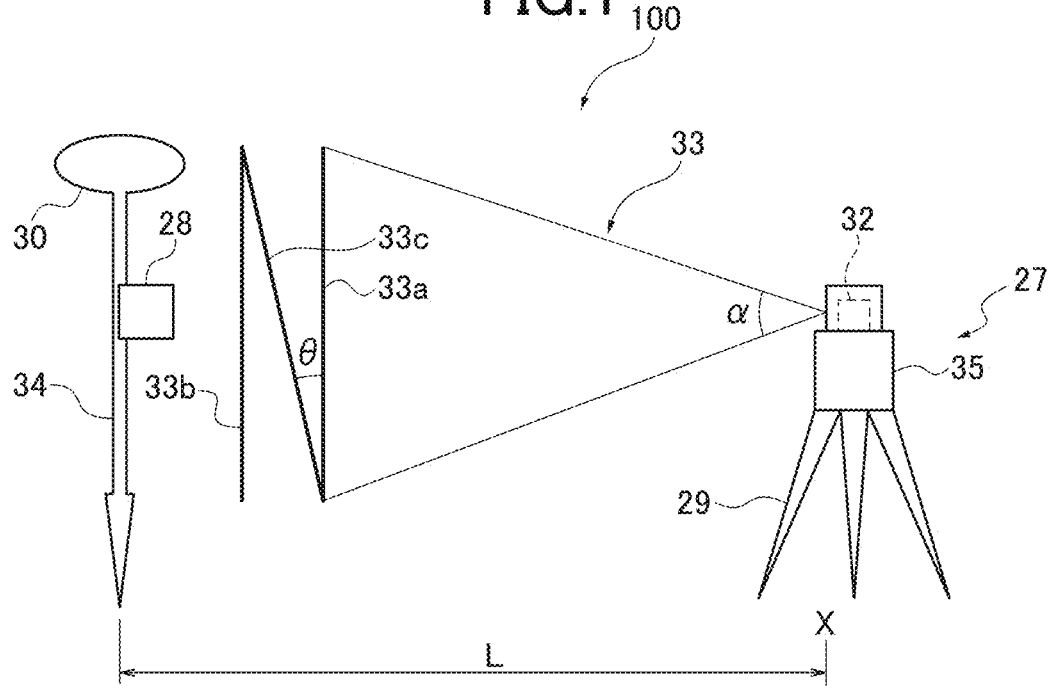
FIG. 1 shows the structure of a survey system including a laser surveying device according to one embodiment.

FIG. 1 shows a survey system 100 using a rotational laser device 27 as laser surveying device according to a first embodiment.

The survey system 100 comprises a rotational laser device 27 to rotate to project a fan beam around and a light receiver 28 of the fan beam.

The survey system 100 is placed so that a tripod 29 approximately matches with a known point X. The rotational laser device 27 is attached on the tripod 29 for surveying and it comprises a laser head 32 rotatable to a later-described casing 35. The laser head 32 is rotated to project a laser beam 33.

The light receiver 28 is held on a desired support and mounted on a handheld rod 34 so that an operator can carry. A GPS system 30 is mounted on the top end of the rod 34. The GPS system 30 can measure absolute positions on the ground on the basis of signals from a satellite so that the height of the GPS system 30 from a ground surface can be measured.

Figure 2:
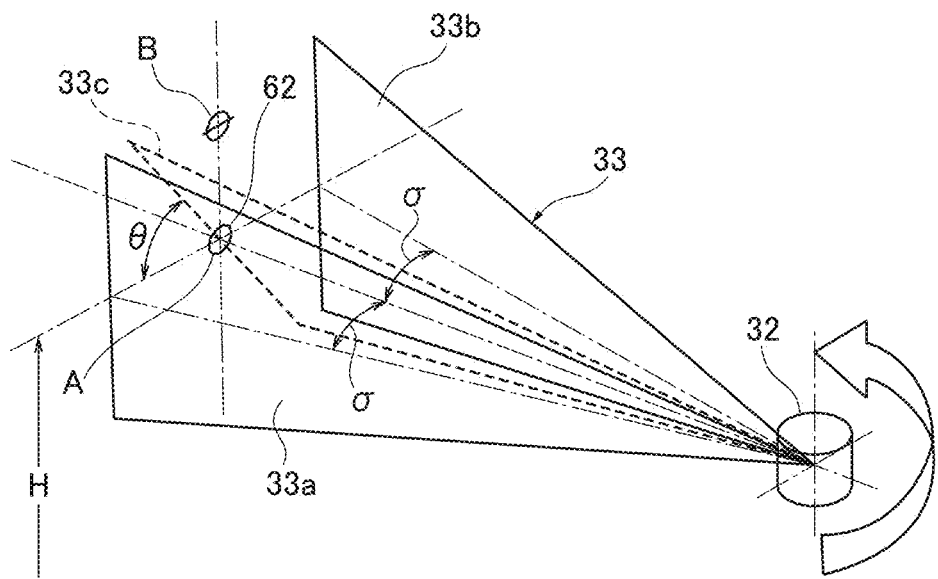
FIG. 2 shows fan beams of a rotational laser device.

The laser beam 33 consists of fan-shape laser beams, and is in an N shape of vertical fan beams 33a, 33b and a fan beam 33c inclined at angle θ on a diagonal relative to the fan beams 33a, 33b, for example. As shown in FIG. 2, the fan beams 33a, 33b are projected at a divergence angle α in ±δ direction. The fan beams 33a, 33b do not need to be vertical and have only to be parallel to each other and intersect with a horizontal plane. FIG. 2 shows a light receiving portion 62 of the light receiver 28.

Figure 3:
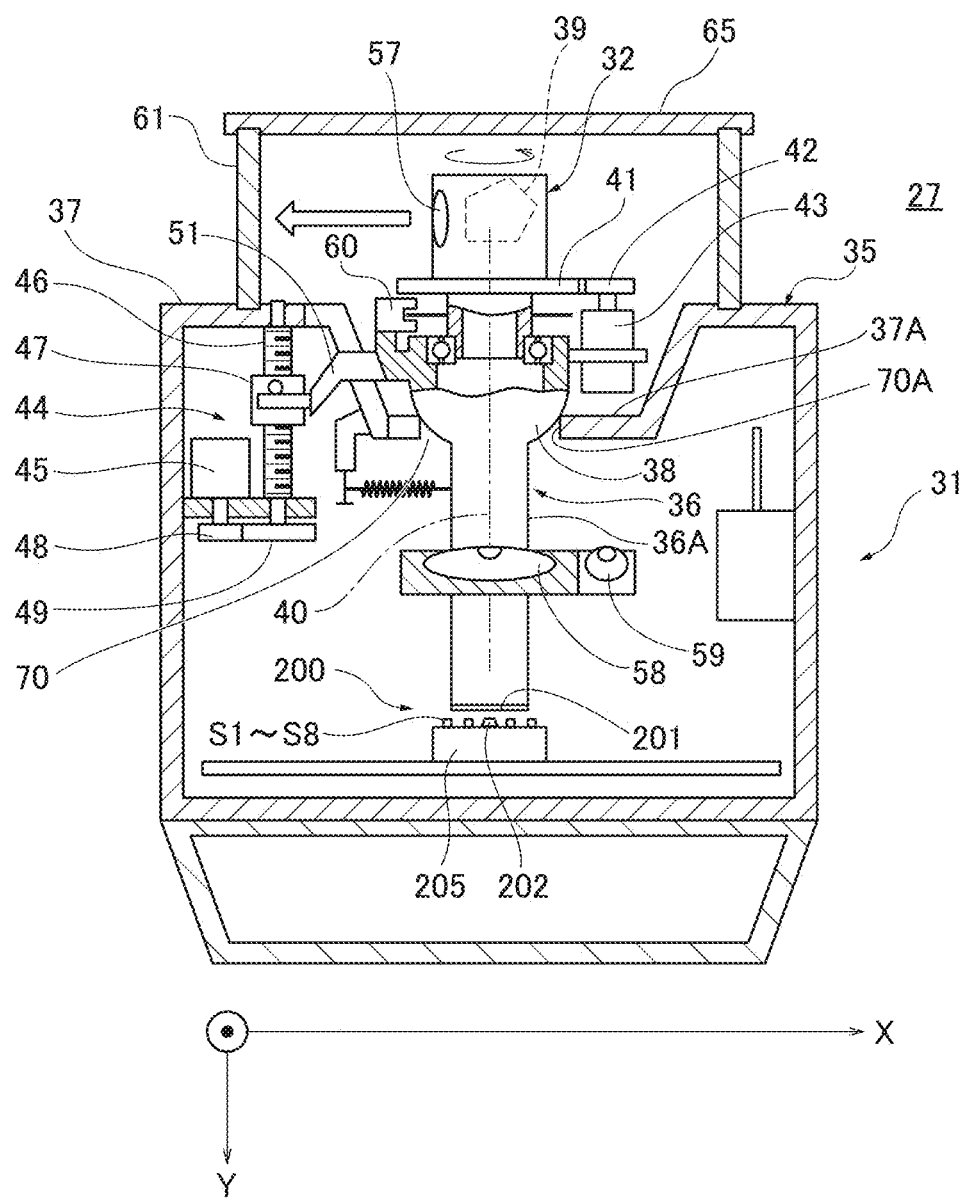
FIG. 3 is a cross section view of the structure of a rotational laser device in FIG. 1.
Figure 4:
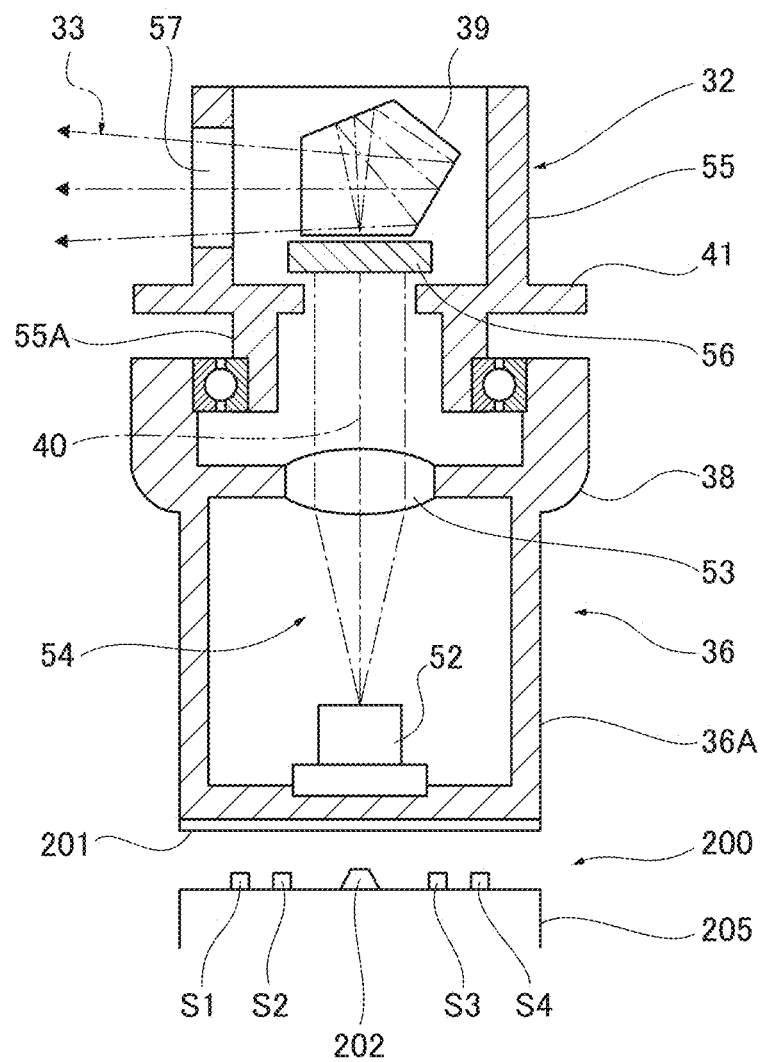
FIG. 4 is a cross section view of the structure of the laser projector of the rotational laser device.

Referring to FIGS. 3 and 4, the rotational laser device 27 comprises a housing 31, a laser projector 36 with a projection axis 40 tiltably provided in the housing 31, a tilt mechanism 44 to tilt the laser projector 36, a laser head 32 rotatably provided over the laser projector 36, and a tilt angle detector 200 to detect a tilt angle of the laser projector relative to the housing 31.

The housing 31 includes a casing 35 and a cover glass 61 provided on the casing 35. The cover glass 61 is supported by not-shown four columns and a top board 65 is attached on the cover glass 61.

A top wall 37 of the casing 35 includes, at the center, a depression 37A of a head-off conic shape with a hole 70 at the center.

The laser projector 36 comprises a cylindrical body 36A, a laser diode 52 provided in the bottom of the body 36A, and a collimate lens 53.

The body 36A includes a spherical seat 38 on a top outer circumference. The body 36A is inserted from above into the hole 70 of the depression 37A of the casing 35 so that the spherical seat 38 is rotatably supported by an edge 70A of the hole 70. The laser projector 36 is tiltable at 360 degrees via the spherical seat 38.

A pair of tilt arms 51 is provided on the upper side of the body 36, extending orthogonally relative to the projection axis 40. The tilt arms extend orthogonally to each other, although only one of them is shown in the drawing.

The laser diode 52 projects a laser beam upward, and the collimate lens 53 is configured to convert the laser beam to a parallel beam. The laser diode 52 and collimate lens 53 form a projection system 54.

A scan motor 43 with a drive gear 42 on a drive shaft is provided on the top side of the body 36A.

The laser head 32 comprises a pentaprism 39, a cylindrical prism holder 55 containing the pentaprism 39, a diffraction grating (BOE: binary optical element) 56 under the pentaprism 39, and a window 57.

The prism holder 55 includes a small diameter portion 55A at bottom which is rotatably supported on the body 36A of the laser projector 36 via a bearing. A scan gear 41 is provided between the small diameter portion 55A and prism holder 55 to engage with the drive gear 42 of the scan motor 43.

The scan motor 43 is driven to rotate the laser head 32 about the projection axis or rotational axis 40 via the drive gear and scan gear 41 relative to the body 36A of the laser projector 36.

The rotational angle of the laser head 32 is decided from a detection signal corresponding to a rotational angle detected by an encoder 60.

A pair of tilt mechanisms 44 is disposed in the casing 35 of the housing 31, although only one of them is shown in FIG. 3.

One of the tilt mechanisms 44 comprises a tilt motor 45 in the casing 35, a tilt screw 46 with a rotational center in parallel to the laser projector 36, and a tilt nut 47 into which the tilt screw 46 fits. A drive gear 48 attached on the drive shaft of the tilt motor 45 is engaged with a tilt gear 49 attached on the bottom of the tilt screw 46. Along with the driving of the tilt motor 45, the tilt screw 46 is rotated to vertically move the tilt nut 47.

The tilt nut 47 includes a not-shown joining portion into which a pin at end of the tilt arm 51 of the laser projector 36 is fitted. By vertical movement of the tilt nut 47, the laser projector 36 is tilted in X direction as shown in FIG. 3.

Figure 10:
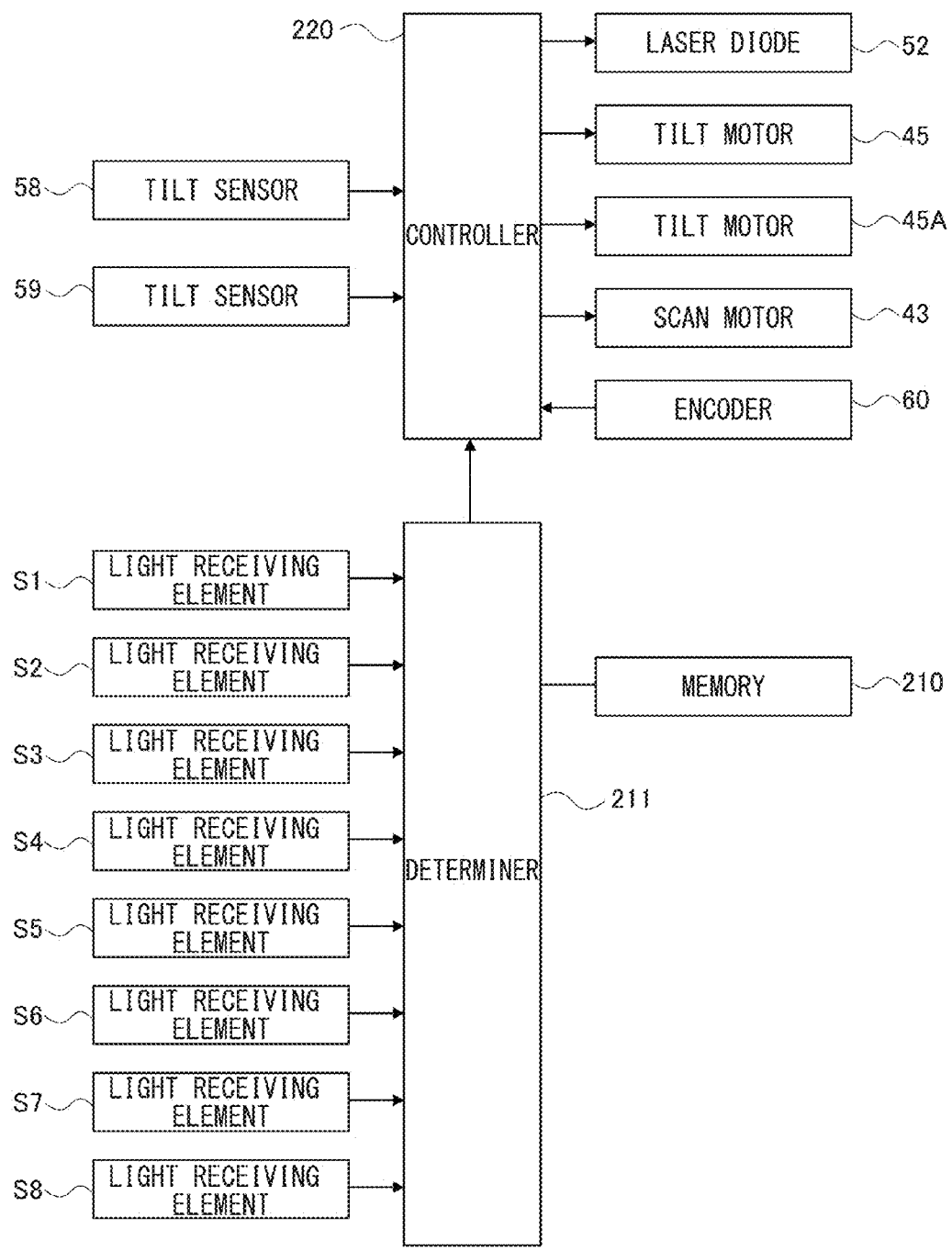
FIG. 10 is a block diagram of the structure of a control system of the rotational laser device.

The other of the tilt mechanisms 44 has the same configuration and comprises a tilt motor 45A (FIG. 10). The laser projector 36 is tilted in Y direction (orthogonal to the drawing) shown in FIG. 3 by the vertical movement of the tilt nut.

The laser projector 36 further comprises, in a middle part, a first tilt sensor 58 parallel to the tilt arm 51 and a second tilt sensor 59 orthogonal to the tilt arm 51.

The first and second tilt sensors 58, 59 can accurately detect tilt angles of the laser projector 36 in X and Y directions up to about 40 minutes, respectively. The pair of tilt mechanisms 44 can control the two tilt arms 51 to tilt the laser projector 36 according to a result of the detection by the first and second tilt sensors 58, 59, so that the laser projector 36 can constantly remain vertical or be tilted at an arbitrary angle. According to the present embodiment the laser projector 36 is controlled to be constantly vertical.

The tilt angle detector 200 comprises a pattern plate 201 provided on the bottom of the body 36A, light receiving elements S1 to S8 arranged to face the pattern plate 201, a lamp 202 for illuminating the pattern plate 201, and a determiner 211 (FIG. 10) to determine a tilt direction and amount of the laser projector 36 on the basis of the light receiving amounts of the light receiving elements S1 to S8.

The light receiving elements S1 to S8 and lamp 202 are provided on a board 205, facing the pattern plate 201.

Figure 5:
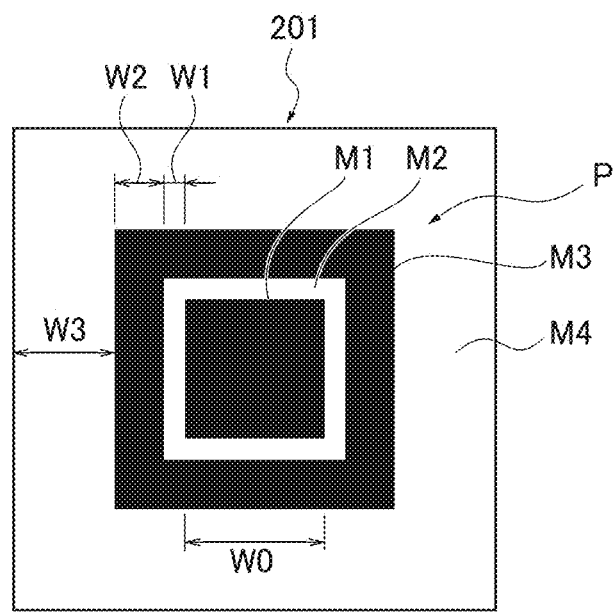
FIG. 5 shows a pattern formed on a pattern plate.

Referring to FIG. 5, four marks M1 to M4 are formed on the pattern plate 201. A black square mark M1 is formed at the center thereof and surrounded by a white frame-like mark M2 in a width W1. The mark M2 is surrounded by a black frame-like mark M3 in a width W2 (>W1) and the mark M3 is surrounded by a white frame-like mark M4 in a width W3 (>W2). Thus, a light and dark pattern P is formed from the center to outward by the marks M1 to M4. The widths of the marks M1 to M4 are different and the width of the mark M1 is W0 (>W3 where W3>W0/2).

Figure 6:
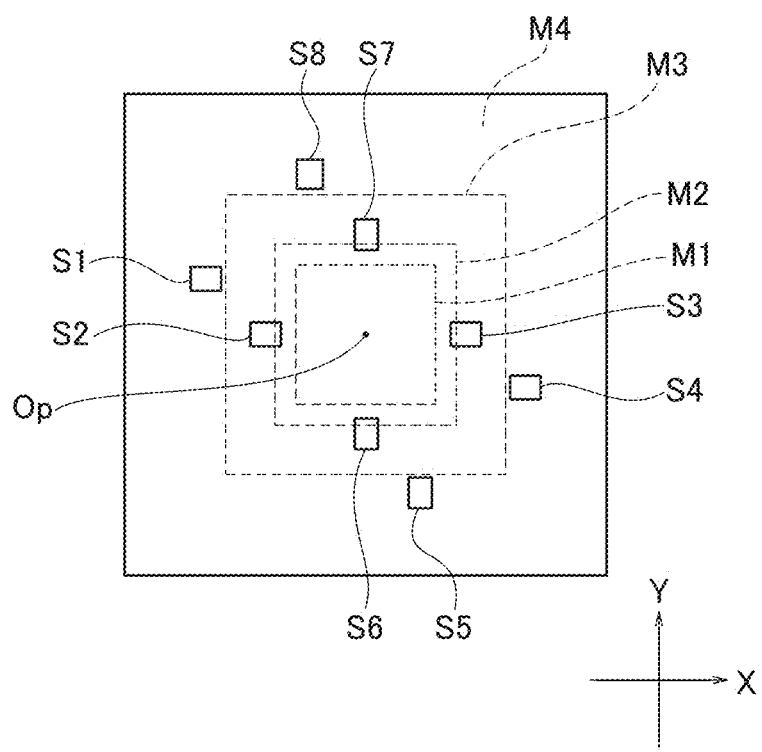
FIG. 6 shows the arrangement of a pattern on the pattern plate and light receiving elements.

FIG. 6 shows the arrangement of the light receiving elements S1 to S8 on the pattern plate 201 when the tilt angle of the laser projector 36 relative to the housing 31 is zero.

Referring to FIG. 6, the light receiving elements S1 to S4 as first light receiving elements are arranged on the board 205 in X direction as a first direction and the light receiving elements S1, S2 and S3, S4 are symmetrically arranged relative to the center Op of the pattern P. The light receiving element S1 is placed to oppose the left side of the mark M4 and near the edge of the mark M3.

The light receiving element S2 opposes the left side of the mark M3 partially overlapping with the mark M2. The light receiving elements S3, S4 oppose the right sides of the marks M4, M3 symmetrically relative to the light receiving elements S1, S2 and the center Op, respectively.

The light receiving elements S1 to S4 are configured to receive light beams reflected by different portions of the pattern P of the pattern plate 201.

Referring to FIG. 6, the light receiving elements S5 to S8 as second light receiving elements are arranged on the board 205 in Y direction as a second direction. The light receiving elements S5, S6 and S7, S8 are symmetrically arranged relative to the center Op of the pattern P. The light receiving element S5 opposes the bottom side of the mark M4 and near the bottom edge of the mark M3.

The light receiving element S6 opposes the bottom side of the mark M3 partially overlapping with the mark M2. The light receiving elements S7, S8 oppose the top side of the marks M3, M4 symmetrically relative to the light receiving elements S5, S6 and the center Op.

The light receiving elements S5 to S8 are configured to receive light reflected by different portions of the pattern P of the pattern plate 201.

FIGS. 7A to 7G shows the relation between the tilt angle of the laser projector 36 or pattern plate 201 and the positions of the light receiving elements S1 to S4 relative to the marks M1 to M4.

Figure 7A:
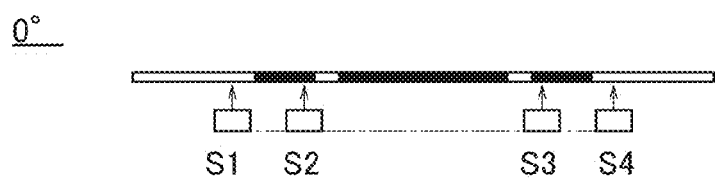
FIGS. 7A to 7G show the positions of the light receiving elements when the pattern plate is tilted.
Figure 7B:
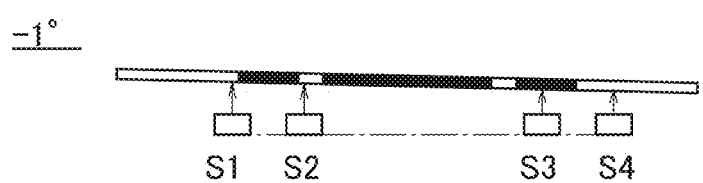
Figure 7C:
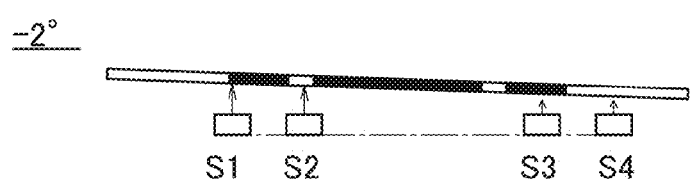
Figure 7D:
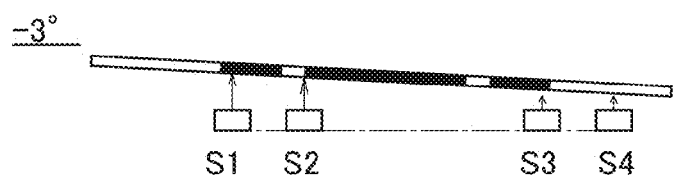
Figure 7E:
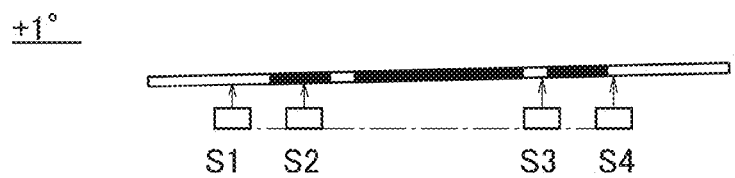
Figure 7F:
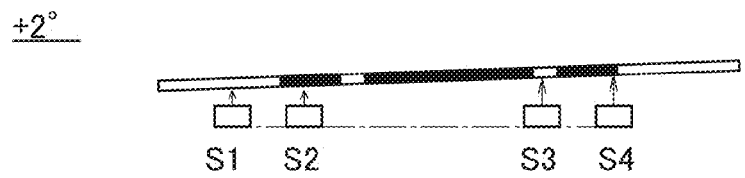
Figure 7G:
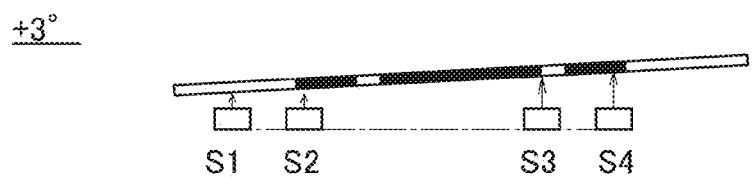

In FIG. 7A when the tilt angle of the laser projector 36 relative to the housing 31 is zero, the light receiving elements S1, S4 receive a reflected light by the mark M4 and the light receiving elements S2, S3 receive a reflected light by the mark M3. The white mark M4 reflects a larger amount of light so that the light receiving elements S1, S4 receiving the light from the mark M4 is defined to be in ON state. The amount of light reflected by the black mark M3 is almost zero so that the light receiving elements S2, S3 receiving the light from the mark M3 is defined to be in OFF state. At tilt angle of zero, the states of the elements S1 to S4 are shown in Table 1.

Likewise, FIGS. 7B to 7G show the tilt angles −1 to −3 and +1 to +3 degrees, respectively and the states of the light receiving elements S1 to S4 at the respective tilt angles are shown in Table 1 in FIG. 8.

The tilt direction and angle of the laser projector 36 can be determined from the ON or OFF state of the light receiving elements S1 to S4 in Table 1.

Similarly, Table 2 in FIG. 9 shows the relation between the tilt angle of the laser projector 36 in Y direction and the states of the light receiving elements S5 to S8 when the laser projector 36 is tilted in Y direction.

The tilt angle detector 200 can detect the tilt angle up to 3 degrees in unit of degree, as shown in Tables 1 and 2.

FIG. 10 is a block diagram showing the structure of a control system of the rotational laser device 27. The tilt angle detector 200 comprises a controller 220, a determiner 211, and a memory 210. The memory 210 contains Tables 1 and 2 in FIGS. 8, 9. The determiner 211 determines the tilt direction and angle of the laser projector according to the ON or OFF state or light receiving amount of the light receiving elements S1 to S8.

The controller 220 is configured to control the tilt motors 45, 45A according to a result of the detection by the first and second tilt sensors 58, 59 so that the laser projector is oriented to a vertical direction. It also controls the light emission of the laser diode 52 on the basis of the rotational angle of the laser head 32 detected by the encoder 60 and the tilt direction and angle of the laser projector obtained by the determiner 211.

Next, the operation of the above rotational laser device 27 is described. First, referring to FIG. 1, the tripod 29 is placed approximately on the known point X and the rotational laser device 27 is mounted on the tripod 29. Upon a manipulation of a not-shown switch, the controller 220 in FIG. 10 controls the tilt motors 45, 45A to drive and rotate the tilt screw 46 according to the detection of the first tilt sensors 58, 59 of the pair of tilt mechanisms 44. Thereby, the tilt nut 47 is vertically moved to adjust the laser projector 36 to be vertical.

Then, the determiner 211 of the tilt angle detector 200 obtains the tilt direction and angle (amount) of the laser projector 36 relative to the housing 31, referring to Tables 1, 2 in FIGS. 8, 9 stored in the memory 210.

The controller 220 drives the laser diode 52 to project a laser beam and drives the scan motor 43 to rotate the laser head 32.

The laser beam 33 from the laser diode 52 is converted to a parallel beam by the collimate lens 53 (FIG. 4), incident on the diffraction grating 56, and split thereby into the three fan beams $33a$, $33b$, $33c$ in FIG. 2. The fan beams $33a$ to $33c$ are deflected by the pentaprism 39 in horizontal direction to emit through the window 57 of the prism holder 55.

Along the rotation of the laser head 32 by the scan motor 43, the fan beams $33a$ to $33c$ are rotationally projected at 360 degrees about the projection axis 40. The light receiver 28 of the rod 34 in FIG. 1 receives the fan beams $33a$ to $33c$ for surveying. Surveying is conducted in the conventional manner, therefore, a description thereof is omitted.

Figure 11:
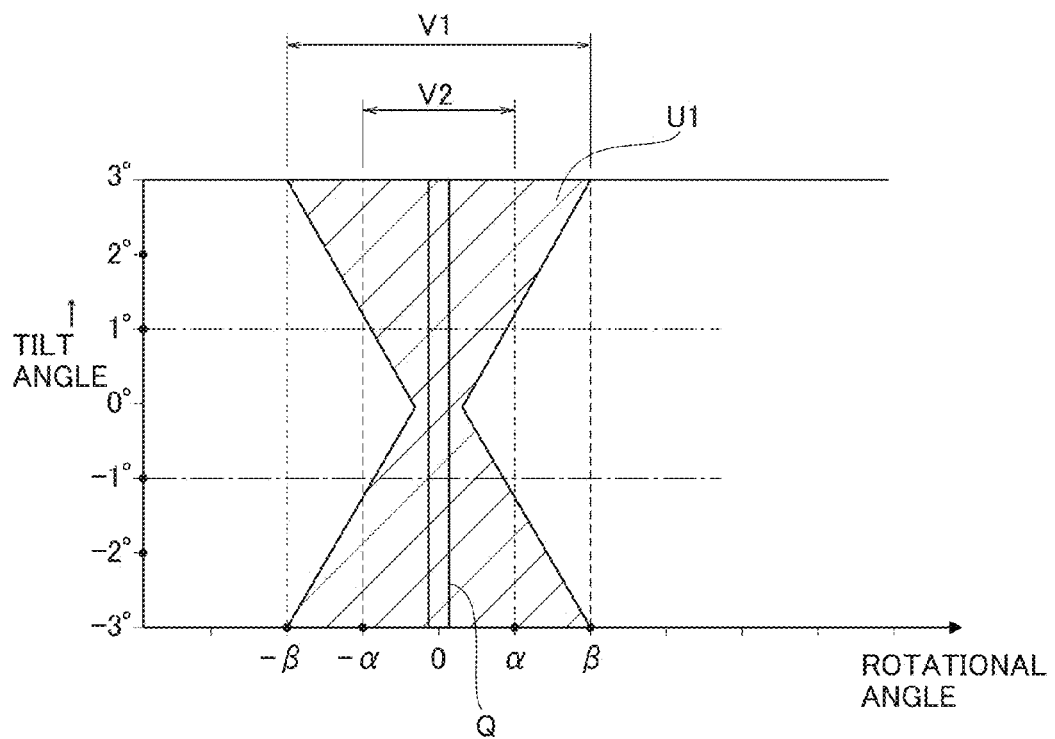
FIG. 11 is a graph showing the range of rotational angles of a laser head in which beam projection is stopped, relative to the tilt angle of the laser projector.

There may be a case where the fan beams $33a$ to $33c$ are blocked by the four columns of the cover glass 61 of the housing 31. As a result, the fan beams $33a$ to $33c$ are deformed in profile, which leads to lowering surveying accuracy. The shaded area U1 in FIG. 11 is an area in which surveying accuracy is lowered, and it changes depending on the tilt angle of the laser projector relative to the housing 31 and the larger the tilt angle, the larger the area U1. In view of this, in related art the laser diode 52 is configure to stop projecting a laser beam in an area corresponding to an assumed maximal tilt angle. That is, if the maximal tilt angle relative to a column Q is 3 degrees and the column Q is positioned at the rotational angle 0 of the laser head 32 in FIG. 11, for example, the beam projection of the laser diode 52 is stopped while the laser head 32 is rotating in the angle range of $-\beta$ to $+\beta$. Thus, irrespective of the actual tilt angle of the laser projector 36, the beam projection is stopped in the angle range V1 in FIG. 11.

For example, when the laser projector 36 is tilted at 1 degree relative to the column Q, the beam projection needs to be stopped in the range V2 of $-\alpha$ to $+\alpha$ smaller than the range V1 in FIG. 11. Thus, the illumination area with the laser beam for surveying is unnecessarily narrowed.

According to the present embodiment the tilt angles of the laser projector 36 relative to the four columns Q are found from the tilt direction and angle thereof relative to the housing 31, and the angle range in which the laser beam projection is stopped is found for each of the four columns Q from the tilt angles.

The controller 220 obtains the rotational angle of the laser head 32 on the basis of the detection signal from the encoder 60 and controls the laser diode 52 to stop projecting the laser beam when the rotational angle relative to each column Q falls within the angle range in which the beam projection is to be stopped, or the shaded area U1 in FIG. 11.

Thereby, the illumination area with the laser beam does not have to be needlessly decreased.

The tilt angle detector 200 is a simple structure comprising the pattern plate 201 on which the marks are formed and the light receiving elements S1 to S8. Thus, it can detect the tilt direction and angle with a simple structure, and the rotational laser device 27 can be provided at a lower price.

Further, the tilt angle detector 200 is configured to detect the tilt angle of the laser projector 36 in stages in unit of 1 degree. However, the present invention should not be limited thereto. For example, the marks M1 to M4 can be decreased in width and the tilt angle detector can be configured to detect the tilt angle in stages in unit of 0.5 degree.

The pattern P can be arbitrarily formed and the light receiving elements S1 to S8 can be arbitrarily arranged as long as the tilt direction and angle of the laser projector 36 can be found. The arrangement of light receiving elements S1 to S8 should not be limited to the one shown in FIG. 6.

Second Embodiment

FIG. 12A shows a pattern plate 250 and light receiving elements S1a to S5a of a tilt angle detector according to a second embodiment. In the second embodiment the tilt direction and tilt angle is detected by five light receiving elements and a different pattern plate 250. Note that a light receiving element S3a placed to oppose the center of the plate 250 functions as both the first and second light receiving elements arranged in X and Y directions.

Figure 12:
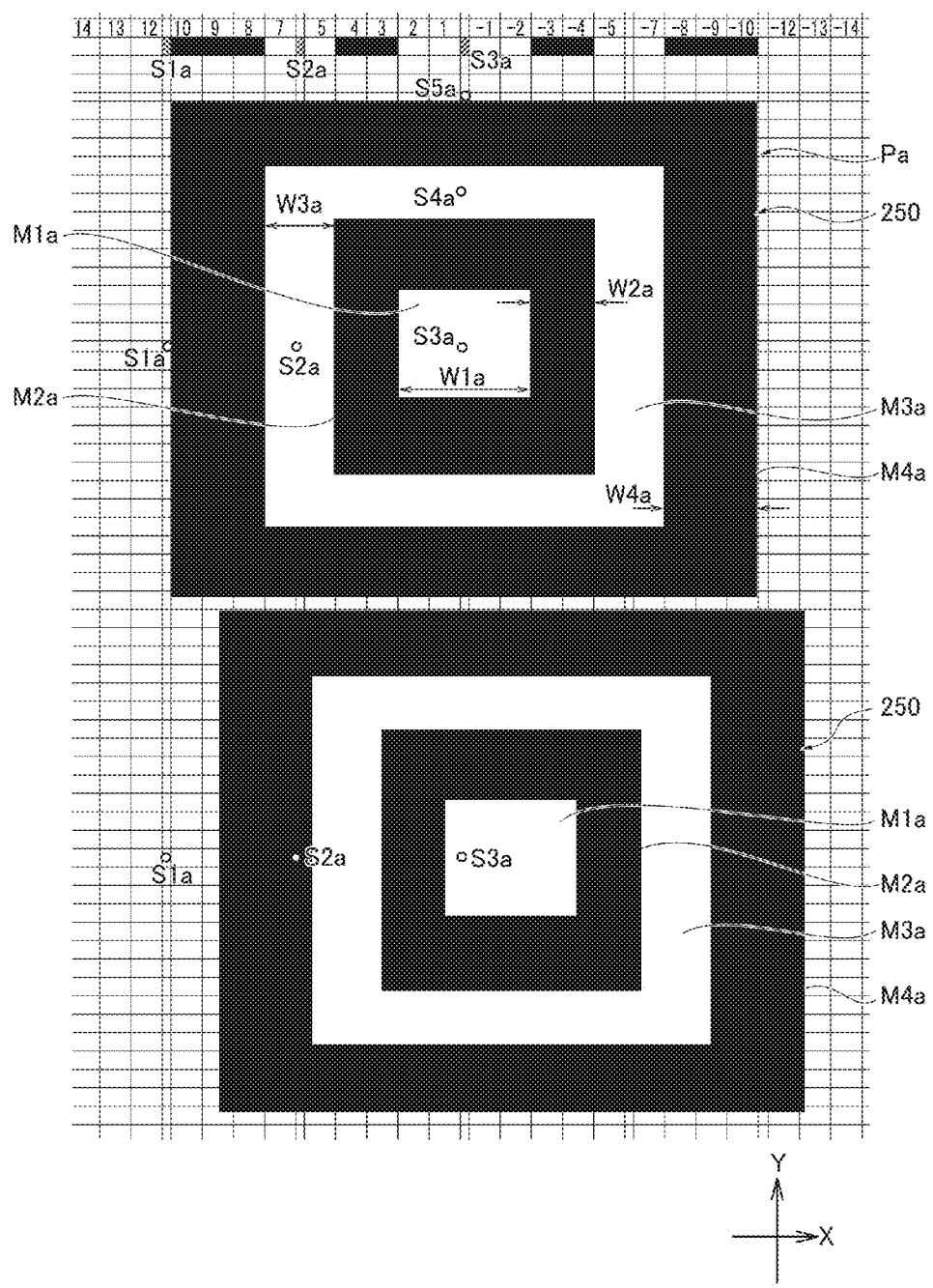
FIG. 12 shows the arrangement of the pattern on the pattern plate according to a second embodiment and the light receiving elements as well as the positions of the pattern and the light receiving elements when the pattern plate is moved.

Four marks M1a to M4a are formed on the pattern plate 250. A white square mark M1a is formed at the center and surrounded by a black frame-like mark M2a. The mark M2a is surrounded by a white frame-like mark M3a and the mark M3a is surrounded by a black frame-like mark M4a. Thus, a light and dark pattern Pa of the marks M1a to M4a is formed from the center to outward. The widths W2a and W3a of the marks M2a and M3a are approximately the same and the width W2a of the mark M2a is about a half of that of the mark M1a. The width W4a of the mark M4a is larger than that of the mark M3a and smaller than that of the mark M1a. FIG. 12A shows the arrangement of the light receiving elements S1a to S5a relative to the pattern plate 250 when the tilt angle of the laser projector 36 relative to the housing 31 is zero. The light receiving element S1a is placed on the board 205 corresponding to near the left-side border of the mark M4a. The light receiving element S2a is placed corresponding to the center of the left side of the mark M3a and the light receiving element S3a is placed corresponding to the center of the mark M1a. The light receiving element S4a is placed corresponding to the center of the top side of the mark M3a. The light receiving element S5a is placed corresponding to outside and near the top border of the mark M4a. In this arrangement the light receiving elements S1a to S3a are in ON state and remains ON even if the pattern plate 250 is tilted in X direction at 0.99 degree in FIG. 12, as shown in Table 3 in FIG. 13. Referring to FIG. 12B, with the pattern plate 250 tilted at 1.5 degrees rightward or in X direction, the light receiving elements S1a, S2a, S3a become ON, OFF, ON, respectively, as shown in the angle 1 to 1.99 of Table 3 in FIG. 13. Similarly, with the tilt angle of 2 to 2.99 in X direction, the light receiving elements S1a, S2a, S3a become ON, OFF, OFF, respectively.

Likewise, when the pattern plate 250 is moved leftward in a range of more than 0 to 0.99 degree from the position in FIG. 12A, the light receiving elements S1a, S2a, S3a become OFF, ON, ON, respectively.

With a further tilt of the pattern plate 250 in a range of −1 to −1.99 degree, the light receiving elements S1a, S2a, S3a become OFF, OFF, ON, respectively. With a tilt angle from −2 to −2.99 degree, the light receiving elements S1a, S2a, S3a all become OFF.

Table 4 in FIG. 14 shows the states of the light receiving element S5a to S3a when the pattern plate 250 is tilted in Y direction or vertically. The ON or OFF states of the light receiving elements S5a to S3a when the pattern plate 250 is tilted downward are the same as those S1a to S3a when the pattern plate 250 is tilted rightward.

If the pattern plate 250 is tilted vertically or in Y direction at 2 to 2.99 degrees, the light receiving element S3a becomes OFF and remains OFF even if the pattern plate 250 is moved in X direction. Thus, the tilt direction and amount in X direction becomes undetectable. Likewise, when the pattern plate 250 is tilted in X direction or leftward or rightward in a range of 2 to 2.99 degrees, the light receiving element S3a becomes OFF and remains OFF even if the pattern plate 250 is moved in Y direction. The tilt direction and amount in Y direction becomes undetectable.

That is, according to the present embodiment the tilt direction and angle can be detected in the angle ranges F1, F2 in Tables 3, 4 in FIGS. 13, 14, that is, within a 2 degree range in X and Y directions.

Third Embodiment

Figure 15:
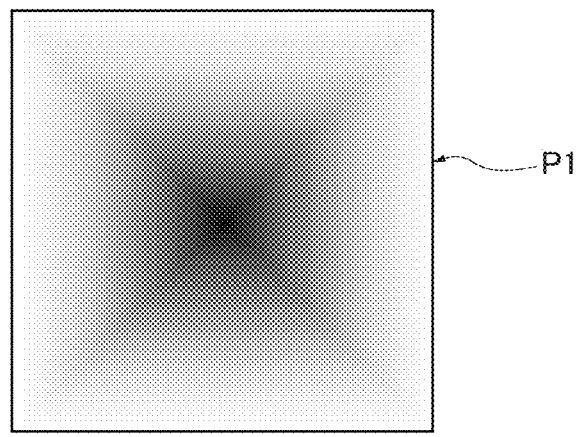
FIG. 15 shows an example of a gradation pattern.

FIG. 15 shows a pattern P1 which lowers in density from the center to outward. The light receiving elements S1 to S8 are arranged as shown in FIG. 6 in accordance with the pattern P1, and the tilt direction and amount of the laser projector 36 can be obtained from a magnitude of change in the light receiving amount of each of the light receiving elements S1 to S8, or they can be obtained only with the light receiving elements S2, S3, S6, S7. Further, a tilt amount can be more finely obtained.

The pattern P1 can be formed such that it decreases in density from the outside to the center.

Figure 16:
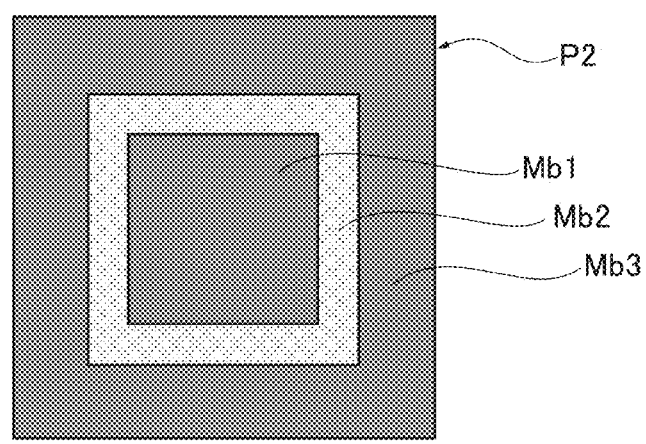
FIG. 16 shows an example of a pattern of marks in different colors.

FIG. 16 shows a pattern P2 formed of marks Mb1 to Mb3 in different colors. In this case the light receiving elements S1 to S8 include color filters on their light receiving surfaces, to reflect only corresponding colors of the marks Mb1 to Mb3.

Likewise, the pattern Pa in FIG. 12 can be formed of the marks M1a to M3a in different colors. Then, color filters are provided on the surfaces of the light receiving elements S1a to S5a to reflect only corresponding colors of the marks.

Figure 17:
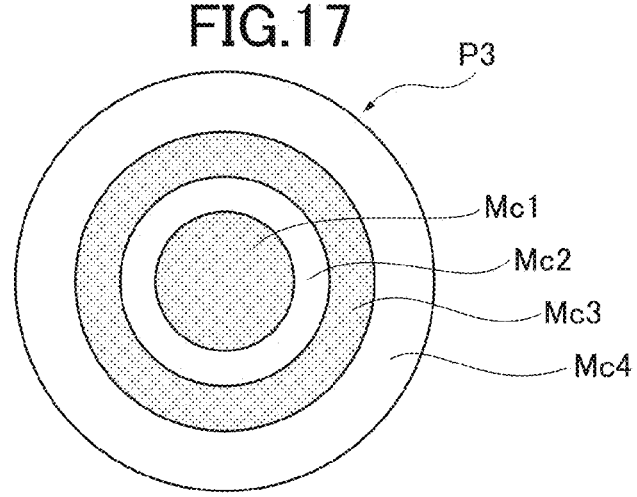
FIG. 17 shows an example of a pattern of circular marks.

Further, FIG. 17 shows a pattern P3 formed of circular marks Mc1 to Mc4. By properly setting the widths of the marks Mc1 to Mc4, the tilt direction and amount of the laser projector 36 can be found with the light receiving elements S1 to S8 in FIG. 6 or S1a to S5a in FIG. 12.

The shape of the pattern can be arbitrarily set, for instance, in triangular in addition to the examples above as long as the tilt direction and angle of laser projector 36 can be obtained. Moreover, the arrangement and number of the light receiving elements S1 to S8 and S1a to S5a can be arbitrarily set.

Although the present invention has been described in terms of exemplary embodiments, it is not limited thereto. It should be appreciated that variations or modifications may be made in the embodiments described by persons skilled in the art without departing from the scope of the present invention as defined by the following claims.

What is claimed is:

1. A laser surveying device comprising:
   a rotatable and tiltable laser head in a housing to rotate about a rotational axis set in a certain direction and project a laser beam around; and
   a tilt angle detector to detect a tilt angle of the laser head relative to the housing, including
      a pattern plate on which a certain pattern is formed, provided in one of the laser head and the housing,
      light receiving elements arranged in the other of the laser head and the housing at different positions opposite to positions of the pattern plate to receive light beams reflected by the pattern plate, and
      a determiner to determine a direction and an amount of tilt of the laser head on the basis of a light receiving amount of each of the light receiving elements.

2. The laser surveying device according to claim 1, wherein the light receiving elements include three first light receiving elements arranged in a first direction from a position opposite to a center of the pattern plate and three second light receiving elements arranged from the opposite position in a second direction orthogonal to the first direction.

3. The laser surveying device according to claim 2, wherein one of the first and second light receiving elements functions as both the first and second light receiving elements.

4. The laser surveying device according to claim 1, wherein the light receiving elements include four first light receiving elements arranged in a first direction and symmetrically relative to a position opposite to the center of the pattern plate and four second light receiving elements arranged in a second direction orthogonal to the first direction and symmetrically relative to the opposite position.

5. The laser surveying device according to claim 1, wherein the pattern is a light and dark pattern in which light and dark portions are repeatedly arranged from a center to an outside, the light and dark portions with different widths from each other.

6. The laser surveying device according to claim 1, wherein the pattern is formed to expand from a center to an outside and includes different color portions with different widths from each other.

7. The laser surveying device according to claim 1, wherein the pattern is formed to gradually increase or decrease in density from a center to an outside.

8. The laser surveying device according to claim 1, further comprising a tilt sensor to detect a tilt angle of the laser head relative to a vertical line, wherein the tilt angle detector is set to detect the tilt angle in a wider range than a tilt angle range of the tilt sensor; and a detection resolution of the tilt angle detector is set to be lower than a detection resolution of the tilt sensor.

* * * * *